G. F. TADINI.
COUPLING.
APPLICATION FILED APR. 6, 1916.
1,269,335.
Patented June 11, 1918.
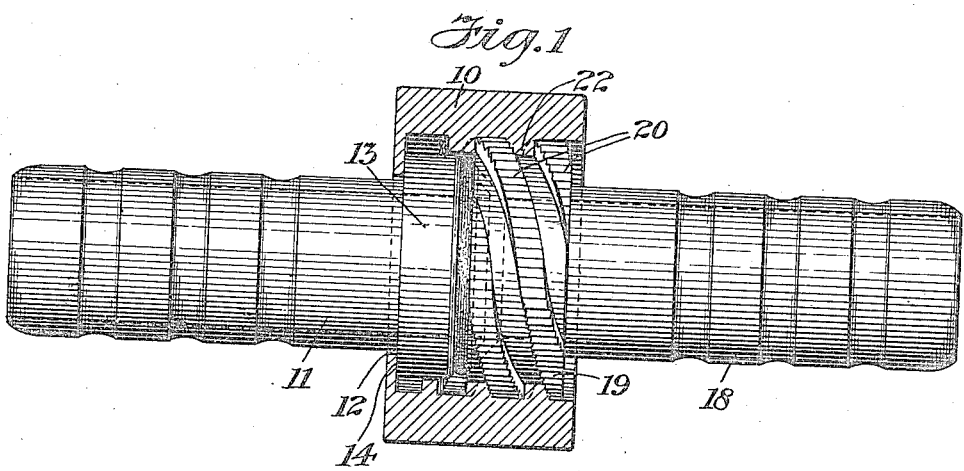
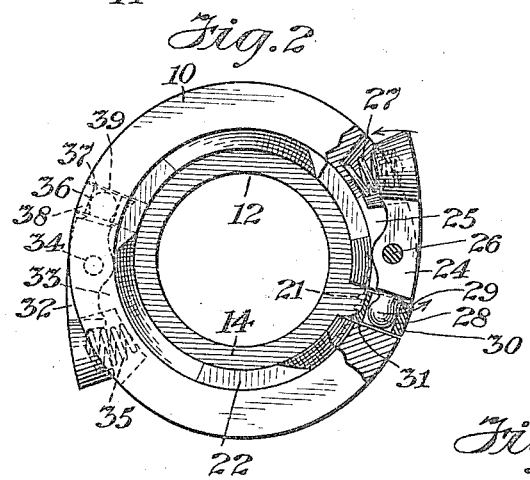
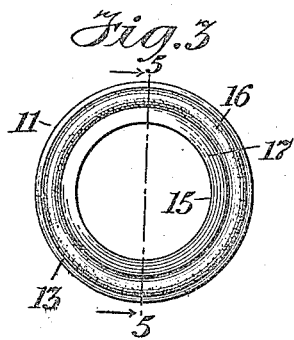
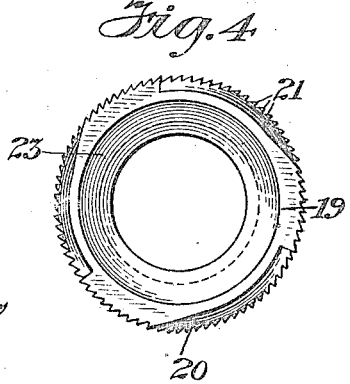
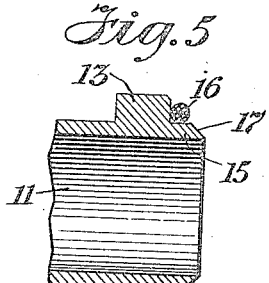
Inventor
Jerome F. Tadini
By his Attorneys
Serrell & Son

UNITED STATES PATENT OFFICE.

GEROME F. TADINI, OF NEW YORK, N. Y.

COUPLING.

1,269,335.  Specification of Letters Patent.  Patented June 11, 1918.

Application filed April 6, 1916. Serial No. 89,274.

*To all whom it may concern:*

Be it known that I, GEROME F. TADINI, a citizen of the United States, residing in the borough of Manhattan, city, county, and State of New York, have invented an Improvement in Couplings, of which the following is a specification.

My present invention relates to couplings and particularly to pipe or hose couplings. Heretofore various forms of connections for joining the adjacent ends of hose or other pipes have been employed in which not only considerable time but also considerable manual labor is necessary in making the joint, for example, in the hose couplings in which a socket member provided with a washer is adapted to be screwed down on the threaded end of a stud member to make the joint. Furthermore in some forms of hose coupling it is necessary to employ tools provided for the purpose in making the joint.

Now the object of this invention is the provision of an inexpensive hose coupling in which the parts may be connected manually by being given approximately a one-quarter turn in relation to one another, and in conjunction with which means are employed in maintaining the parts in their connected relationship as will be hereinafter more particularly described.

In the drawing,

Figure 1, is a partial cross section and longitudinal elevation of a hose coupling illustrating my present invention.

Fig. 2, is a plan and partial cross section of the socket member of the coupling.

Fig. 3, is an end view of one of the pipe connections.

Fig. 4, is an end view of the other pipe connection, and

Fig. 5, is a longitudinal section on line 5, 5, Fig. 3.

By reference to the drawing it will be seen that in carrying out my invention I employ a socket member 10 made of any suitable metal. Associated with the socket member is a pipe connection 11 passing through an opening 12 in one end of the socket member and provided with a flange or head 13 adapted to bear against the end 14 of the socket member when the parts are in position. As indicated at 15, the pipe connection 11 is extended on the opposite side of the head 13 to provide a seat between the same and the adjacent surface of the head for a gasket 16, and this extension 15 of the pipe connection 11 is preferably beveled as indicated at 17 in order to fit within the correspondingly beveled end of a pipe connection 18.

At one end the pipe connection 18 is provided with a head 19 adapted to be received and maintained in the socket member 10 in such a relationship as to obtain a tight joint between the pipe connections within the socket member. The head 19 of the pipe connection 18 is provided with a square screw thread 20 the peripheral surface of which is provided with teeth or notches indicated at 21. This screw threaded head of the pipe connection is adapted to coöperate with the screw thread 22 provided in the socket member 10, the pitch of the threads being such that approximately a one-quarter turn of the pipe connection 18 will bring it into close and firm contact with the end of the pipe connection 11 so as to make a tight joint between the same. The inner end of the pipe connection 18 as hereinbefore indicated is internally beveled as shown at 23 to receive the beveled end 17 of the pipe connection 11.

In order to maintain the pipe connections in contact with each other within the socket member 10, I prefer to employ suitable pawl members adapted to engage the teeth 21 on the peripheral surface of the screw thread 20 together with suitable means for operating the pawls. As shown in Fig. 2, this may be accomplished by a lever 24 fitting within a recess 25 in the socket member within which it is pivotally connected at 26. The lever 24 is normally maintained in the position indicated in Fig. 2 by a spring 27 extending between a portion of the socket member and into a recess provided therefor adjacent one end of the lever 24. The other end of the lever is provided with a rounded extremity 28 fitting within an aperture 29 in a pawl member 30 movable within a slot 31 provided therefor in the socket member 10. In this position the pawl 30 engages with the teeth of the peripheral surface of the screw thread 20 to maintain the head 19 of the pipe connection 18 in position against the end of the pipe connection 11. Similarly and in a diametrically opposite position the socket member 10 is also provided with a lever 32 fitting within a recess 33 and pivotally mounted therein as indicated at 34. This lever is maintained in its normal position by a spring 35 acting against one end thereof while the opposite end is provided with a rounded extremity 36 fitting within an aperture 37 provided therefor in a pawl 38 which operates in a slot 39 in the socket member 10 to also engage the teeth of the peripheral surface on the screw thread 20. This assists the pawl 30 in maintaining the parts in position.

From the foregoing it will be apparent that in connecting the parts of this coupling it is only necessary to depress the spring actuated ends of the levers 24 and 32, and after placing the head of the pipe connection 18 in the proper position, to turn the pipe connection a one-quarter revolution, and then release the levers to permit the pawl to engage the teeth of the peripheral surface of the screw thread 20.

I claim as my invention.

1. A pipe coupling comprising a pipe end, a socket thereon provided with a square internal screw thread, a second pipe end, a head thereon having a square screw thread with a serrated peripheral surface and adapted to engage with the square internal screw thread in the socket, a pawl slidable in a seat provided therefor in the said socket, and a lever pivoted in a recess provided therefor in the socket and having at one end a rounded extremity lying within a recess in the said pawl for actuating the same.

2. A pipe coupling comprising a pipe end having a flange thereon and being beveled at its extremity, a gasket fitting over the beveled end of the pipe and lying adjacent one face of the flange, a socket on the said pipe end provided with a square internal screw thread, a second pipe end internally beveled at its extremity to receive the beveled extremity of the aforesaid pipe end, a head on the second pipe end having a square screw thread with a serrated peripheral surface adapted to engage with the square internal screw thread in the socket, a pawl slidable radially in a seat provided therefor in the socket, a lever pivoted in a recess in the said socket and having at one end a rounded extremity lying within a recess provided therefor in the pawl, and a spring acting against the opposite end of the lever for normally maintaining the said pawl in a position to engage the serrated peripheral surface of the screw thread on the head of the second pipe end.

Signed by me this 14th day of March, 1916.

GEROME F. TADINI.

Copies of this patent may be obtained for five cents each, by addressing the "Commissioner of Patents, Washington, D. C."